Aug. 19, 1952    J. M. ANDERSON    2,607,881
LIGHT AND MIRROR ATTACHMENT FOR HOSPITAL BEDS
Filed April 4, 1951
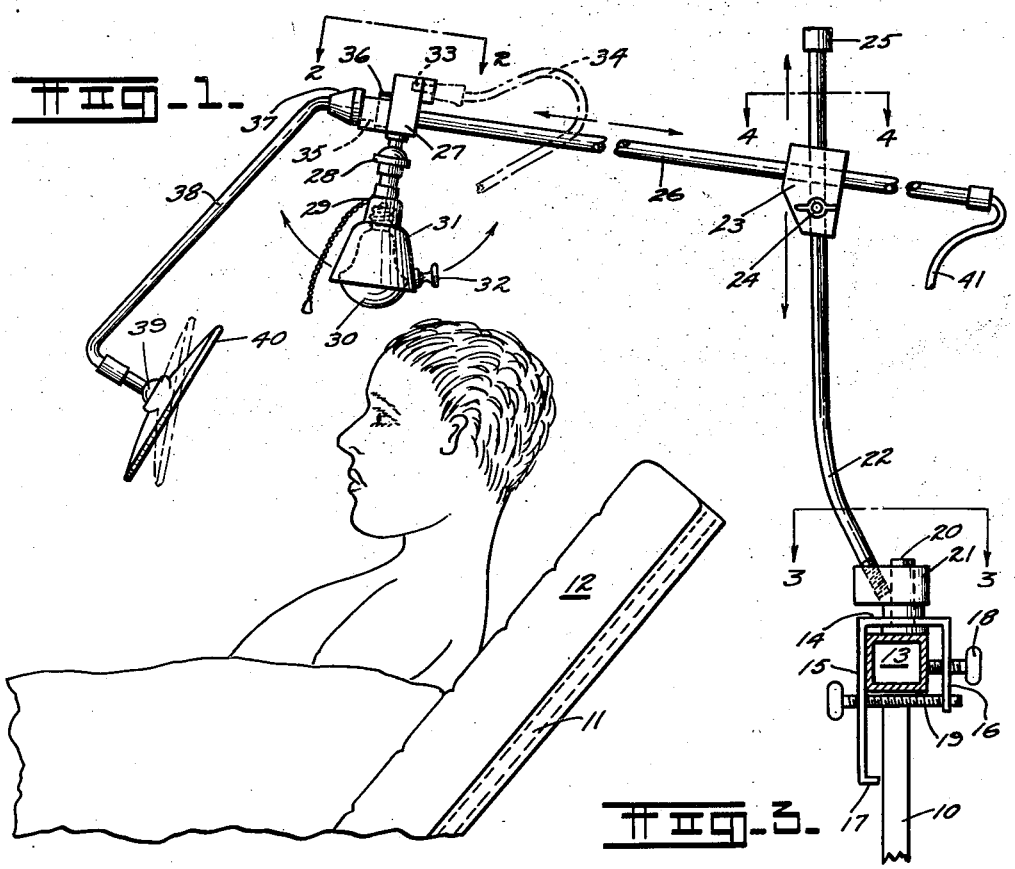
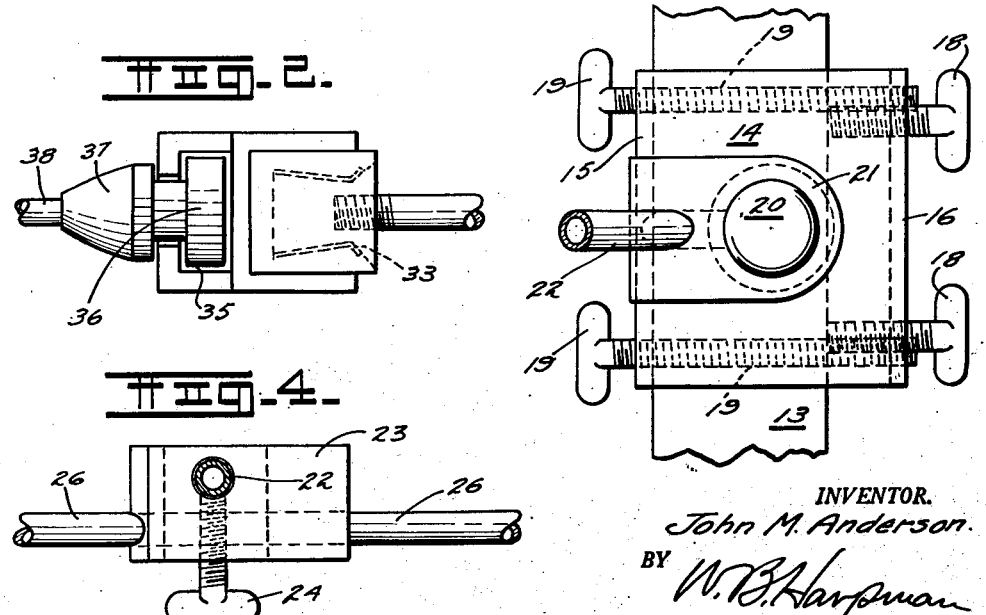
INVENTOR.
John M. Anderson.
BY W. B. Harpman
ATTORNEY.

UNITED STATES PATENT OFFICE 2,607,881

LIGHT AND MIRROR ATTACHMENT FOR HOSPITAL BEDS

John M. Anderson, Youngstown, Ohio

Application April 4, 1951, Serial No. 219,267

1 Claim. (Cl. 240—4.2)

This invention relates generally to a bed light and more particularly to a bed light and mounting stand therefor.

The principal object of the invention is the provision of a bed light and mounting stand adapted for use on a hospital bed.

A further object of the invention is the provision of a bed light and mirror combination on an adjustable mounting stand which in turn is attachable to the headboard of a hospital bed.

A still further object of the invention is the provision of a bed light and mirror combination including an extensible mounting stand enabling the light and mirror to be used by a patient in a hospital bed when the same is adjusted to sitting position.

A still further object of the invention is the provision of a bed light mirror and extensible mounting therefor, the mirror portion of which may be readily detachable from the remainder as desired so as to enable a single mirror to be used in connection with several of the light and stand portions of the invention.

The bed light disclosed herein is intended for use on a hospital bed as it enables a patient to position the light at a desired and convenient location to move the same at will and it also provides the patient with an adjustable mirror properly located with respect to the light. The device also incorporates an outlet for an electric circuit so that a device such as an electric razor may be plugged into the same and used by the patient in connection with the mirror in shaving himself.

In hospital wards and particularly veterans' hospitals the provision of the bed light, mirror and power outlet combination is particularly advantageous. The light and mirror combination is arranged to be readily attached securely to various types of hospital beds and when attached thereon it is readily removable therefrom if desired.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of the bed light and mirror attachment in position on a hospital bed.

Figure 2 is an enlarged detailed view of a portion of the device shown in Figure 1 and taken on line 2—2 of Figure 1.

Figure 3 is an enlarged detailed view of a portion of the device shown in Figure 1 and taken on line 3—3 of Figure 1.

Figure 4 is an enlarged detailed view of a portion of the device shown in Figure 1 and taken on line 4—4 of Figure 1.

By referring to the drawings and Figure 1 in particular it will be seen that portions of a hospital bed are illustrated including a headboard 10, springs 11 and mattress 12. The illustrated portion of the springs 11 and mattress 12 are shown in elevated position with respect to the headboard 10 in a position customary with adjustable hospital beds. The top of the headboard 10 includes a transverse rail 13 and the headboard 10 may be formed of a plurality of spaced vertical body members as is customary.

A clamp comprising a body member 14 having spaced depending arms 15 and 16 is positioned over the rail 13 at the top of the headboard 10, it being observed that the depending arm 15 is longer than the depending arm 16 and is inturned at its lowermost end as at 17. The lower inturned end 17 is adapted to rest against the vertical body members of the headboard 10. The depending arm 16 is provided with two pairs of drilled and tapped openings, each pair spaced vertically with respect to the other and the uppermost pair threadably positioning a pair of thumb screws 18 and the lowermost pair threadably receiving a pair of secondary threaded thumb screws 19 which are also positioned through oppositely disposed openings in the depending arm 15. The secondary thumb screws 19 are relatively longer than the secondary thumb screws 18 and are positioned beneath the lower portion of the rail 13 of the headboard 10 while the thumb screws 18 are positioned in the arm 16 so that their innermost ends directly engage the reel 13. It will thus be seen that the body member 14 is securely attached to the headboard 10 by this arrangement.

The body member 14 has an opening through which a vertical stud 20 is positioned. The vertical stud 20 as a mounting for an apertured mounting block 21 which has a vertically extending rod 22 positioned therein, the lower portion of which is preferably inclined forwardly with respect to the vertical stud 20 and the upper portion of which is substantially vertical. A secondary mounting block 23 having vertical and transverse openings therethrough is positioned on the vertical portion of the rod 22 and secured thereon by a thumb screw 24. A cap 25 is positioned on the uppermost end of the rod 22 and limits the upward movement of the secondary mounting block 23.

A tubular arm 26 is positioned through the transverse opening in the secondary mounting block 23 and it will be observed that the transverse opening is inclined with respect to the vertical opening so that the tubular arm 26 extends forwardly and upwardly of the secondary block 23 on one side thereof and rearwardly and downwardly on the other side thereof. The foremost end of the tubular arm 26 has a fitting 27 secured thereto, as best seen in Figures 1 and 2 of the drawings, the fitting 26 having a depending ball and socket assembly 28 a portion of which carries an electrical outlet 29 in which an incandescent bulb 30 is positioned, it being observed that a conical shade 31 is also secured to the outlet 29 and positioned about the bulb 30 and is provided with a projecting handle 32 by means of which the light may be manipulated on the ball and socket 28 which pivotally affixes it to the fitting 27. The upper portion of the fitting 27 has an electrical outlet 33 therein for the reception of a connection plug such as illustrated at 34.

The foremost portion of the fitting 27 has a socket 35 formed therein which is open at the top and the front portion of which is narrower than the rear portion as best illustrated in Figure 2 of the drawings, the socket 35 appearing in top plan view as T-shaped and adapted to receive a T-shaped extension 36 on an annular body member 37 which in turn is affixed to one end of a rod 38. The lower end of the rod 38 is bent at a right angle and is provided with a ball and socket assembly 39. A mirror 40 is carried on one portion of the ball and socket assembly 39. An electrical conductor 41 is positioned in the tubular arm 26 and supplies current for the bulb 30 and the outlet 33. It will be observed that the mirror 40 on the arm 38 can be detached from the fitting 27 by lifting the T-shaped extension 36 out of the socket 35. It will be observed that the tubular arm 26 is held by frictional engagement in the secondary mounting block 23 and that it may be readily moved forwardly or rearwardly with respect thereto so that the bulb 30 is positioned as desired.

The outlet 33 is particularly advantageous for use in energizing an electric razor or other device and the entire bed light attachment can be swung from side to side to move it out of position or to position over the headboard 10 of the bed when desired. It will also be seen that the device is usable when the bed is in elevated position, as shown, or when it is in reclining position as the secondary mounting block 23 is movable vertically on the rod 22 as well as the arm 26 being movable horizontally in the transverse opening therein.

It will thus be seen that a bed light and mirror combination has been disclosed which may be readily attached to a hospital bed and in position thereon and when in position will advantageously serve its intended purpose.

Having thus described my invention, what I claim is:

A bed light and mirror combination for a hospital bed comprising a body member having spaced downturned arms engageable on the headboard of the hospital bed, clamping means on said body member for securing the same to the headboard and a vertical stud on said body member, a mounting block pivotally positioned on said vertical stud, a rod attached to said mounting block and extending forwardly and upwardly with respect thereto, a secondary mounting block having spaced crossed openings therethrough formed at an angle of more than 90°, said rod and an arm respectively slidably mounted in the openings in said secondary mounting block and means for clamping said secondary mounting block to said rod, a fitting on one end of said arm, a light pivotally secured to said fitting and a socket formed in said fitting, a secondary rod having a mirror adjustably positioned on one end thereof and a T-shaped extension on the other end thereof engageable in said socket, said rod, arm, light and mirror being movable in an arc based on said vertical stud and said arm, light and mirror being vertically and horizontally movable with respect to said rod.

JOHN M. ANDERSON.

REFERENCES CITED

The following references are of record in the file of this patent:

UNITED STATES PATENTS

| Number | Name | Date |
|---|---|---|
| 488,851 | Stock | Dec. 17, 1892 |
| 1,643,697 | Christy | Sept. 27, 1927 |
| 2,428,649 | Brown | Oct. 7, 1947 |